UNITED STATES PATENT OFFICE.

JAMES J. RYAN, OF BROOKLYN, NEW YORK.

SALVE.

SPECIFICATION forming part of Letters Patent No. 433,257, dated July 29, 1890.

Application filed March 24, 1890. Serial No. 345,103. (No specimens.)

*To all whom it may concern:*

Be it known that I, JAMES J. RYAN, of Brooklyn, in the county of Kings and State of New York, have invented a new and useful Salve, of which the following is a full, clear, and exact description.

My invention is a salve, and is intended as a remedy for piles.

My composition consists in the following ingredients, combined in the proportions stated, viz.: Pulverized bloodroot, (*Sanguinaria*,) one pound; Armenian bole, one-fourth pound; powdered rosin, one-fourth pound; lard, one and one-half pound; Stockholm tar, one gill. The ingredients are thoroughly mingled and are boiled for from fifteen to twenty minutes. The mixture is then removed from the fire and stirred constantly until it becomes cold.

This salve is used as a remedy for piles, and is applied externally.

Having thus described my invention, what I claim as new, and desire to secure by Letters Patent, is—

The herein-described composition of matter for a salve, consisting of bloodroot, Armenian bole, rosin, lard, and Stockholm tar, in about the proportions specified.

JAMES J. RYAN.

Witnesses:
 M. J. CUMMINGS,
 JAS. S. HALERAN.